(12) United States Patent
Haycraft

(10) Patent No.: US 6,196,563 B1
(45) Date of Patent: Mar. 6, 2001

(54) REVERSIBLE HIGH GROUND CLEARANCE STEERING AXLE

(76) Inventor: Harold W. Haycraft, c/o Hannibal Machine, Inc., 400 S. Eleventh St., Hannibal, MO (US) 63401-4219

( * ) Notice: Subject to any disclaimer, the term of this patent is extended or adjusted under 35 U.S.C. 154(b) by 0 days.

(21) Appl. No.: 09/253,530

(22) Filed: Feb. 22, 1999

Related U.S. Application Data

(60) Provisional application No. 60/111,811, filed on Dec. 11, 1998.

(51) Int. Cl.$^7$ ....................................................... B62D 7/18
(52) U.S. Cl. ................. 280/93.512; 180/905; 301/124.1; 29/897.2
(58) Field of Search ........................ 280/93.504, 93.512; 301/124.1; 29/897.2; 180/905

(56) References Cited

U.S. PATENT DOCUMENTS

| | | | |
|---|---|---|---|
| 1,385,483 | * | 7/1921 | Carter .................................... 228/136 |
| 1,841,735 | * | 1/1932 | Hufferd . |
| 2,911,262 | * | 11/1959 | Franck . |
| 3,804,467 | * | 4/1974 | Austermann .......................... 301/127 |
| 3,966,260 | * | 6/1976 | Braun . |
| 4,361,360 | * | 11/1982 | Kuether ................................. 301/127 |
| 5,429,423 | * | 7/1995 | Pollock et al. ..................... 301/124.1 |
| 5,588,660 | * | 12/1996 | Paddison .............................. 280/95.1 |
| 5,741,027 | * | 4/1998 | Stroh et al. ........................... 280/787 |
| 5,865,452 | * | 2/1999 | Chalin ............................ 280/124.125 |

* cited by examiner

Primary Examiner—Paul N. Dickson
(74) Attorney, Agent, or Firm—Birch, Stewart, Kolasch & Birch, LLP

(57) ABSTRACT

An apparatus and method substantially reduce moments of a steering axle while substantially increasing clearance between the steering axle and a ground surface and increasing strength of the axle. The method and apparatus also include a reversible high ground clearance steering axle having stops at different relative locations which facilitate mounting of the steering axle on more than one type of vehicle.

30 Claims, 5 Drawing Sheets

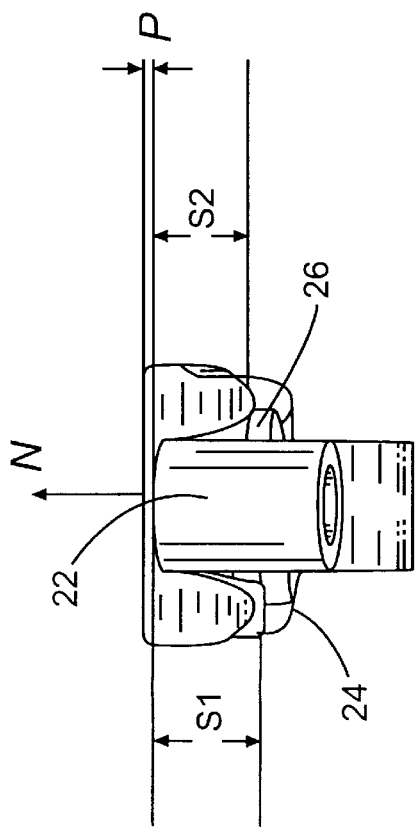
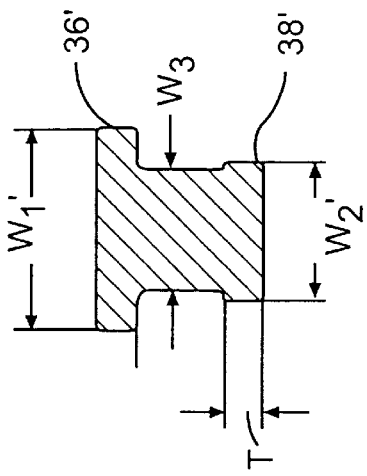
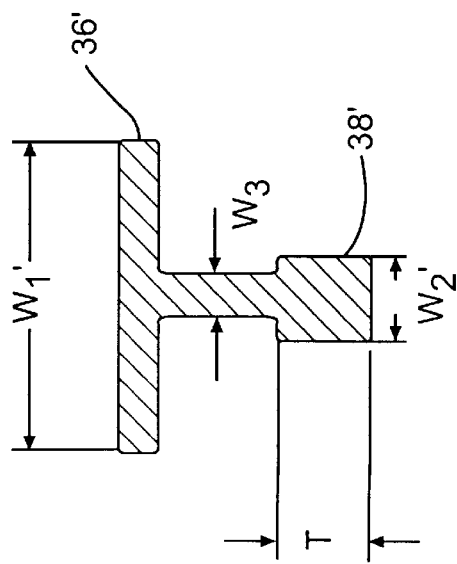
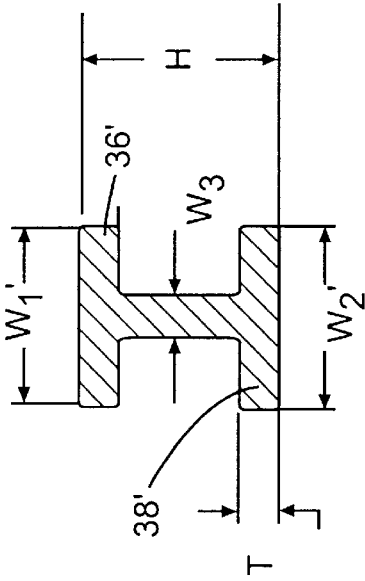
FIG. 9
FIG. 10
FIG. 11
FIG. 12

US 6,196,563 B1

REVERSIBLE HIGH GROUND CLEARANCE STEERING AXLE

This is a patent application claiming priority under 35 U.S.C. § 119 (e) of Provisional Application Serial No. 60/111,811 filed on Dec. 11, 1998.

BACKGROUND OF THE INVENTION

1. Field of the Invention

The present invention relates to an apparatus and method for reducing moments of a reversible steering axle while substantially increasing ground clearance and strength of the reversible steering axle. The reversible steering axle is typically employed in heavy duty off-road vehicles.

2. Description of the Background Art

The conventional art of FIG. 13 is a schematic of a standard U-shaped steering axle 10 which includes kingpin bore cylinders 12. The kingpin bore cylinders 12 support a kingpin (not shown) that connects a steering knuckle (not shown) to the steering axle 10. In off-road environments, the steering axle 10 is subjected to large forces that interact with the kingpin bore cylinders 12 of the steering axle 10. The forces, in turn, create moments which place the steering axle 10 under tremendous stress.

The conventional steering axle 10 does not permit a vehicle to travel over substantially rough terrains due to low ground clearance C between the conventional steering axle 10 and the ground G. The steering axle 10 of the conventional art is subjected to moments M1 and $M2_1$, $M2_2$ that are created by forces F1 and F2 and their respective perpendicular distances X1 and X2. The perpendicular distances X1 and X2 define the spacing between the forces and their respective rotational axes R1, or $R2_1$, $R2_2$. Due to the substantial magnitude of forces F1, F2 generated in an off-road environment and due to the significant distance between the rotational axes and these forces, large torsional stress M1 and bending $M2_1$, $M2_2$ are produced.

An additional drawback of the conventional art steering axle 10 is the reversibility of such an axle. Reversibility of an axle defines whether a steering axle is capable of being used in two or more types of vehicles. In particular, such a reversibility feature is desirable when the steering axle can be used in two or more distinct types of vehicles made by different manufacturers. The conventional art in FIG. 14 illustrates kingpin bore cylinders 12 which include a first projecting stop 14 and a second projecting stop 16 which are mounted or formed on either side of a kingpin bore cylinder 12.

The first stop 14 is spaced from a top surface of kingpin bore cylinder 12 by a predetermined distance dl while stop 16 is spaced from the top surface of kingpin bore cylinder 12 by a second predetermined distance d2. In the conventional art, distances d1 and d2 are substantially equal. The projecting stops 14, 16 are designed to interact with a stop bolt (not shown) that is attached to a steering knuckle (not shown). In different types of vehicles, the stop bolts interact at distances which are smaller or greater than the first and second distances d1, d2 illustrated in the conventional art. Since both the first and second stops 14, 16 are disposed at the same predetermined distance from the top surface of the kingpin bore cylinder, the conventional steering axle 10 can only be employed in vehicles which have a stop pin at one predetermined location or distance from a steering knuckle. This design does not permit the conventional steering axle 10 to be mounted on different vehicles.

Accordingly, a need in the art exists for a method and an apparatus for substantially reducing moments of a steering axle while substantially increasing ground clearance and strength thereof. Further, a need in the art exists for a method and apparatus for increasing the reversibility of a steering axle so that the axle can be employed with numerous types of vehicles with out substantial retrofitting or increased manufacturing steps of the steering axle.

SUMMARY OF THE INVENTION

It is a primary object of the present invention to provide an apparatus and method for substantially reducing moments of a steering axle while substantially increasing clearance between the axle and a ground surface and increasing strength of the axle. Another primary object of the present invention is to provide a method and apparatus for providing a reversible high ground clearance steering axle which can be mounted on more than one type of vehicle.

An additional object of the present invention is to provide a method and apparatus for providing a reversible high ground clearance steering axle that substantially reduces manufacturing costs while substantially reducing retrofitting of the axle when mounting the axle on different types of vehicles.

A further object of the present invention is to provide a method and apparatus that increases the strength of a steering axle while substantially reducing moments thereof by providing curved sections of a steering axle having a predetermined shape. An additional object of the present invention is to provide a method and apparatus that enables reversibility of a steering axle by employing projections disposed on a kingpin bore a different relative locations.

These and other objects of the present invention are fulfilled by providing a steering axle comprising: a central beam region having a substantially I-shaped cross section, the I-shaped cross section being defined by a first flange spaced apart from a second flange with a web; a first support pad region disposed adjacent to the central beam section; a second support pad region disposed adjacent to the central beam section on a side opposite to the first support pad region, each pad region defining a geometric plane having a geometric normal, each geometric normal pointing away from the second flange; and means for substantially reducing moments of the axle, for substantially increasing clearance between the axle and a ground surface, and for increasing strength of the axle, the means for reducing moments, increasing ground clearance, and strength including: a first curved region disposed adjacent to the first support pad region, the first curved region including a substantially cylindrical bore disposed at an end thereof; a second curved region disposed adjacent to the first support pad region, the second curved region including a substantially cylindrical bore disposed at an end thereof, each first flange of each curved region having a substantially concave shape relative to a respective geometric normal of a respective planar surface, each cylindrical bore being spaced from a respective geometric plane in a direction opposite to a respective normal by a predetermined distance.

In addition, these and other objects of the present invention are also accomplished by providing a method of substantially reducing moments of steering axle while substantially increasing ground clearance and strength of the steering axle, the method comprising: forming a central beam region having a substantially I-shaped cross section; forming the I-shaped cross section by casting a first flange spaced apart from a second flange with a web; forming a first support pad region disposed adjacent to the central beam section; forming a second support pad region disposed adjacent to the central beam section on a side opposite to the first support pad region, each support pad region being continuous with the central beam region, each pad region defining a geometric plane having a geometric normal, each geometric normal pointing away from the second flange; forming a first curved region disposed adjacent to the first support pad region; forming a second curved region disposed adjacent to the first support pad region, each first flange of each curved region having a substantially concave shape relative to a respective geometric normal of a respective planar surface; and spacing ends of each curved region from a respective geometric plane in a direction opposite to a respective normal by a predetermined distance.

Other objects of the present invention are also accomplished by providing a steering axle comprising: a central beam region having a first flange spaced apart from a second flange with a web; a first support pad region disposed adjacent to the central beam section; a second support pad region disposed adjacent to the central beam section on a side opposite to the first support pad region, each pad region defining a geometric plane having a geometric normal, each geometric normal pointing away from the second flange; means for substantially reducing moments of the axle, for substantially increasing clearance between the axle and a ground surface, and for increasing strength of the axle, the means for reducing moments, increasing ground clearance, and strength including: a first curved region disposed adjacent to the first support pad region, the first curved region including a substantially cylindrical bore disposed at an end thereof; a second curved region disposed adjacent to the first support pad region, the second curved region including a substantially cylindrical bore disposed at an end thereof, each first flange of each curved region having a substantially concave shape relative to a respective geometric normal of a respective planar surface, each cylindrical bore being spaced from a respective geometric plane in a direction opposite to a respective normal by a predetermined distance; and reversible stop means disposed adjacent to each bore, whereby the axle is reversible to facilitate installation on multiple types of vehicles.

Other objects of the present invention are also accomplished by providing a method of substantially reducing moments of a reversible steering axle while substantially increasing ground clearance and strength of the steering axle, the method comprising: forming a central beam region by casting a first flange spaced apart from a second flange with a web; forming a first support pad region disposed adjacent to the central beam section; forming a second support pad region disposed adjacent to the central beam section on a side opposite to the first support pad region, each support pad region being continuous with the central beam region, each pad region defining a geometric plane having a geometric normal, each geometric normal pointing away from the second flange; forming a first curved region disposed adjacent to the first support pad region; forming a second curved region disposed adjacent to the first support pad region, each first flange of each curved region having a substantially concave shape relative to a respective geometric normal of a respective planar surface; spacing ends of each curved region from a respective geometric plane in a direction opposite to a respective normal by a first predetermined distance; forming a pair of projections disposed adjacent to each bore; spacing one of each pair of projections disposed at a second predetermined distance from a first surface of a respective bore; and spacing another of each pair of projections disposed at a third predetermined distance from the first surface of a respective bore.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 9 is an end view of the steering axle of the second embodiment of the present invention;

FIG. 10 is a cross-sectional view of the steering axle of the second embodiment of the present invention taken along line X—X of FIG. 7;

FIG. 11 is a cross-sectional view of the steering axle of the second embodiment taken along the line XI—XI of FIG. 7;

FIG. 12 is a cross-sectional view of the steering axle of the second embodiment taken along the line XII—XII of FIG. 7;

DETAILED DESCRIPTION OF THE PREFERRED EMBODIMENTS

Figure 15:
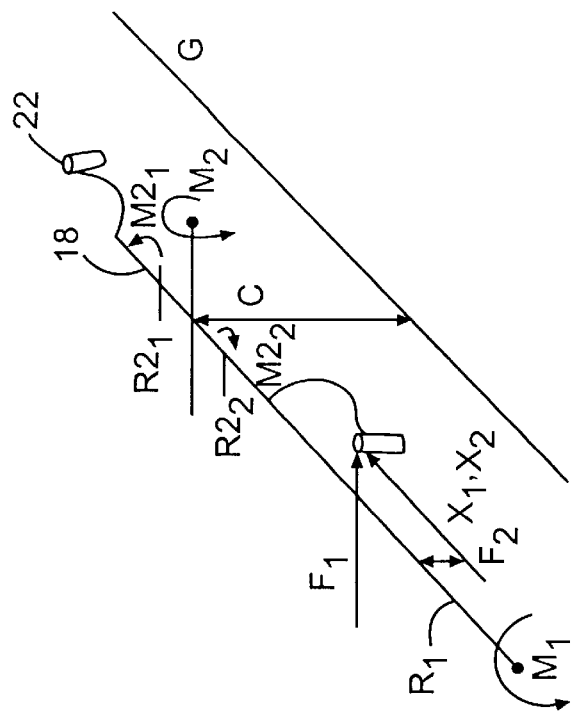
FIG. 15 is a schematic of the steering axle of both the first and second embodiments of the present invention.

Referring in detail to the drawings and with particular reference to FIG. 15, a schematic of the steering axle 18 of the first embodiment and second embodiment of the present invention is shown. The steering axle 18 includes kingpin bore cylinders 22 that support kingpins (not shown) According to the present invention, by decreasing the moment arms or perpendicular distances X1, X2 from the first and second rotation axes R1, $R2_1$, $R2_2$ to the first and second forces F1, F2, the magnitude of the first and second moments M1 and $M2_1$, $M2_2$ are substantially reduced. The decrease in the size of the first and second moment arms X1, X2 then substantially increases the ground clearance C between the steering axle 20 and ground G. The reduction in the magnitudes in the first and second moments M1 and $M2_1$, $M2_2$ also substantially increases the relative strength of steering axle 20.

Figure 16:
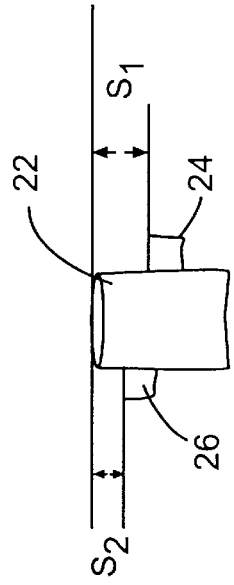
FIG. 16 is a side view of a kingpin bore cylinder of the first and second embodiments of the present invention.
Figure 13:
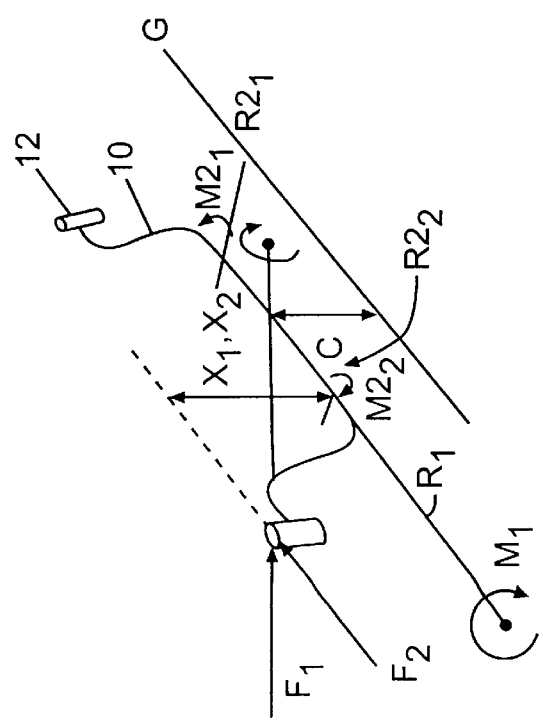
FIG. 13 illustrates a steering axle of the conventional art.
Figure 14:
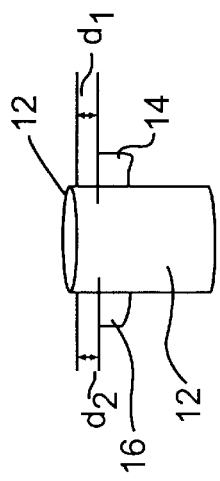
FIG. 14 illustrates a kingpin bore cylinder of the conventional art.

FIG. 16 illustrates a second feature of both the first and second embodiments of the present invention where the reversibility of the steering axle 20 is substantially increased. In FIG. 16, kingpin bore cylinder 22 includes first and second projecting stops 24, 26 respectively. The first projecting stop 24 is spaced from the end surface of the kingpin bore cylinder 22 by a distance S1. The second projecting stop 26 is spaced from an end surface of the kingpin bore cylinder 22 by a second distance S2. The first and second predetermined distances S1 and S2 correspond to at least two different types of vehicles which have different stop pin locations. For example, the first predetermined distance S1 may be set at 2.5 inches while the second predetermined distance S2 may be set at 2 inches. Such magnitudes of the predetermined distances S1 and S2 permit the steering axle 20 to be mounted on two different types of vehicles such as vehicles produced either by the General Motors Corporation (GMC), Ford Motor Company or International Harvester Corporation. Of course, this design is applicable to many different vehicles. Such a design which employs stops 24, 26 at relatively different distances on a kingpin bore cylinder 22, eliminates the need for manufacturing steering axles 20 for a specific type of vehicle. This in turn reduces manufacturing cost while substantially increasing the efficiency of the manufacturing process.

Figure 1:
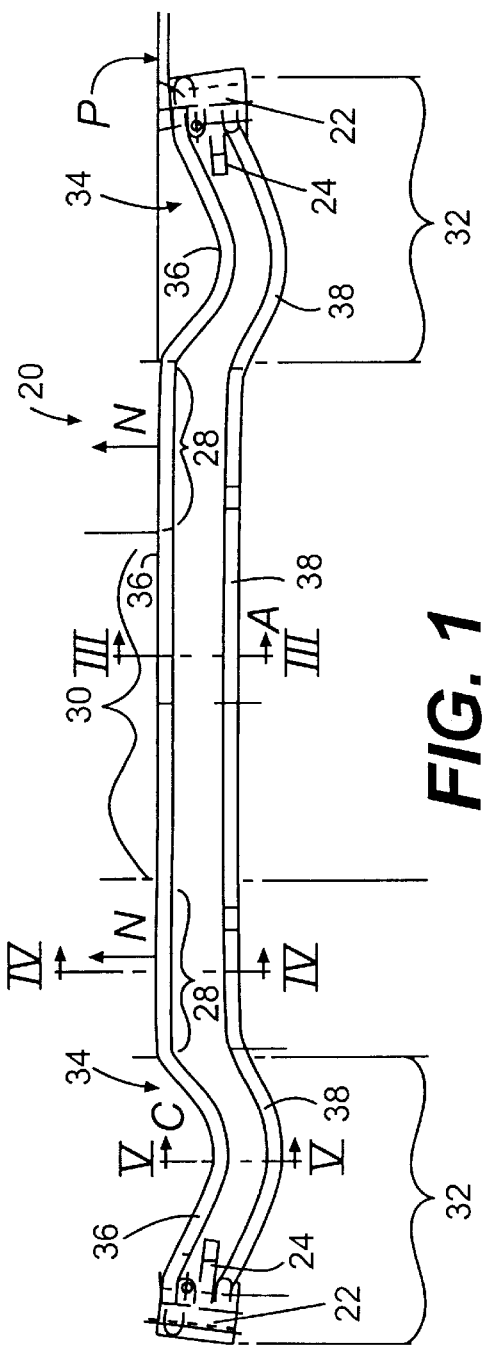
FIG. 1 is a side view of a first embodiment of the present invention.

The design of the present invention balances the need of decreasing the moment arm size while also substantially increasing the strength of the steering axle 18. FIG. 1 illustrates a first embodiment of the present invention where the kingpin bore cylinders 22 are spaced at a predetermined distance P from a geometric plane defined by a support pad region 28 disposed adjacent to a central beam section 30 of the steering axle 20. The kingpin bore cylinders 22 are spaced from the geometric plane defined by the support pad regions by means 32 for substantially reducing moments of the axle 20, for substantially increasing clearance between the axle 20 and a ground surface and for increasing strength of the axle 20.

The means 32 for reducing moments, increasing ground clearance, and strength includes a curved region 34 which is formed by a first flange 36. The curved region 34 is substantially shaped in a concave manner relative to a geometric normal N of the geometric plane defined by the support pad region 28. Relative to the geometric normal N, each of the kingpin bore cylinders 22 are spaced by the redetermined distance P in a direction opposite to the formal N.

Figure 3:
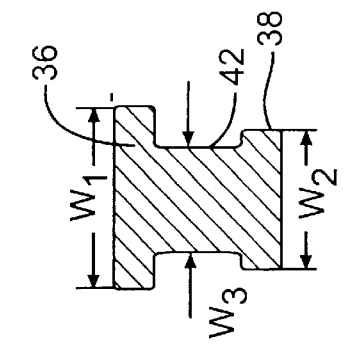
FIG. 3 is a cross-sectional view of a first embodiment of the present invention taken along the line III—III of FIG. 1.

The predetermined distance P is substantially less than or equal to a height dimension H of a cross-section of the central beam region 30 (as illustrated in FIG. 3). The predetermined distance is generally between one quarter to one inch in magnitude but is preferably substantially equal to ⅜ of an inch. Such magnitudes of the predetermined distance P substantially reduce moments of the axle 20 while increasing clearance between the axle 20 and a ground surface. The predetermined distance P in addition to the substantially concave shape of the curved region 34 permits the steering axle 20 to readily couple with steering knuckle assemblies of multiple types of vehicles.

In the first embodiment of the present invention, a second flange 38 in each curved region 34 is shaped in a substantially concave manner relative to a respective geometric normal N. Such a substantially concave shape of the second flange 38 in each curved region 34 makes the second flange 38 in each curved region 34 to be substantially parallel to a respective first flange 36 and the curved region 34.

Figure 2:
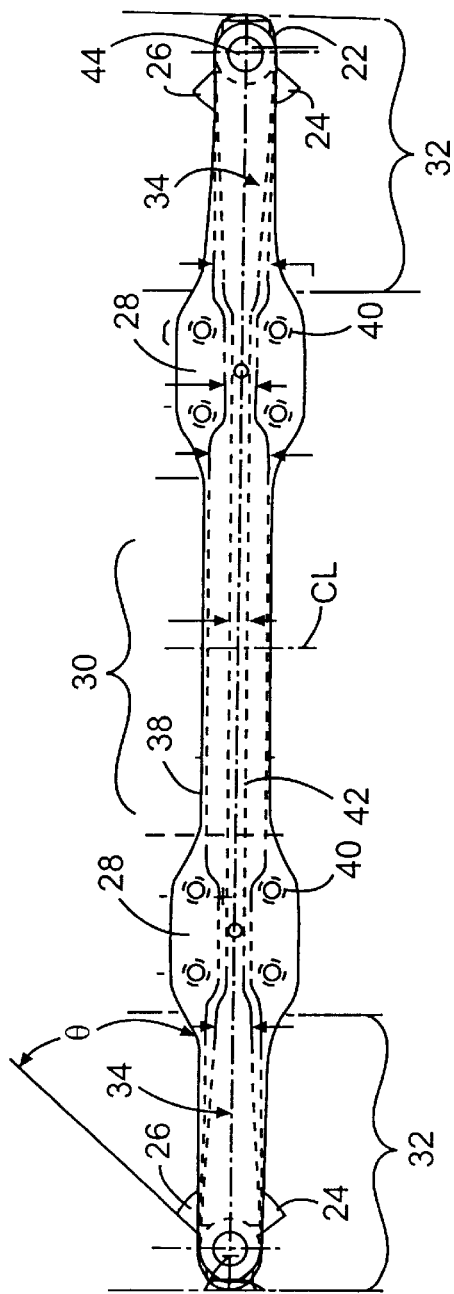
FIG. 2 is an elevational view or plane view of the first embodiment of the present invention.

FIG. 2 illustrates a top view for an elevational view of the steering axle 20 of the first embodiment of the present invention. In this figure, the details of the support pad regions 28 are more readily ascertained. Support pad regions 28 are preferably designed to couple with leaf springs (not shown) of a vehicle. Support pad regions 28 include a plurality of apertures 40 which are designed to support coupling mechanisms (not shown) such as bolts, rivets, screws, and other like fasteners.

Each kingpin bore cylinder 22 has a bore 44 and pair of stops 24 and 26. The first and second projecting stops 24 and 26 preferably have a sector shape. However, the stops of the present invention are not limited to this shape. Other shapes include, but are not limited to, parallelepiped, pentagonal, octagonal, cylindrical, elliptical, or any other shape designed to resist impacts of a stop bolt of a steering assembly. Each projecting stop 24 has a predetermined angle θ which is preferably 50°. However, the present invention is not limited to an angle of this magnitude and may include angles greater or less than this preferred value.

Figure 5:
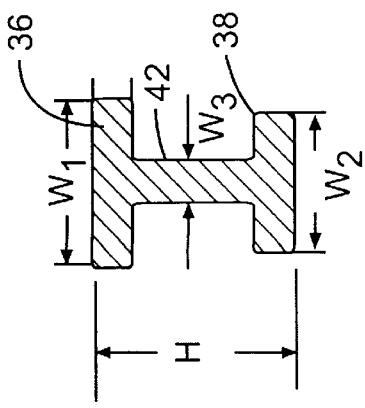
FIG. 5 is a cross-sectional view of the first embodiment of the present invention taken along the line V—V of FIG. 1.

FIG. 2 further illustrates hidden views of the second flange 38 and a web 42 which separates the first flange 36 from the second flange 38. FIG. 2 further illustrates the relative widths of the first flange 36, the second flange 38, and the web 42. In FIG. 5, the first flange 36 has a first width W1 while the second flange 38 in each curved region 34 has a second width W2. The web 42 in curved region 34 has a third width W3. The first width W1 is substantially greater than the second and third widths W2, W3. In each curved region 34, the third width W3 of web 42 increases in size from a respective support pad region 28 to a respective bore cylinder 22.

FIG. 5 illustrates how each curved region 34 has a substantially T-shaped cross section. Such a combination of predetermined relative widths W1, W2 and W3 and the varying of the third width W3 substantially increases the strength of steering axle 20 to compensate for any moments acting thereon.

Figure 4:
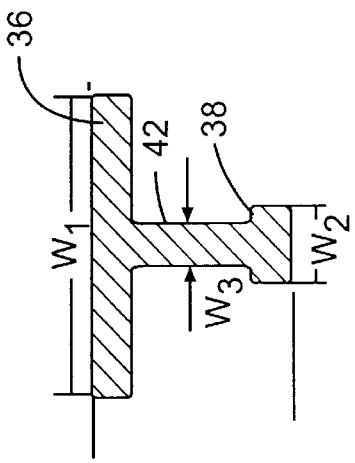
FIG. 4 is a cross-sectional view of the first embodiment of the present invention taken along the line IV—IV of FIG. 1.

As illustrated in FIG. 3, the cross-section of the central beam section is substantially I-shaped. On the other hand, as illustrated in FIGS. 4–5, the predetermined first, second and third widths W1, W2, and W3 have a magnitude such that the cross section of the steering axle 20 in the support pad regions 28 has substantially a T-shaped cross section. These cross sectional shapes of the steering axle 20 contribute to both the strength and stability of the steering axle 20 so that the steering axle 20 can endure the harsh forces that are often experienced in off-road environments.

FIG. 2 further illustrates how the second flange 38 has a substantially double hour-glass shape relative to a centerline CL while web 42 has a substantially singular hour glass shape relative to the centerline CL. As noted above, the varying cross-sectional shapes of the steering axle 20 increase the strength and stability of the steering axle 20 while the specific cross-sectional shape and predetermined spacing P in the curved regions 34 substantially reduce moments of the axle 20 while increasing clearance between the axle 20 and a ground surface.

Figure 6:
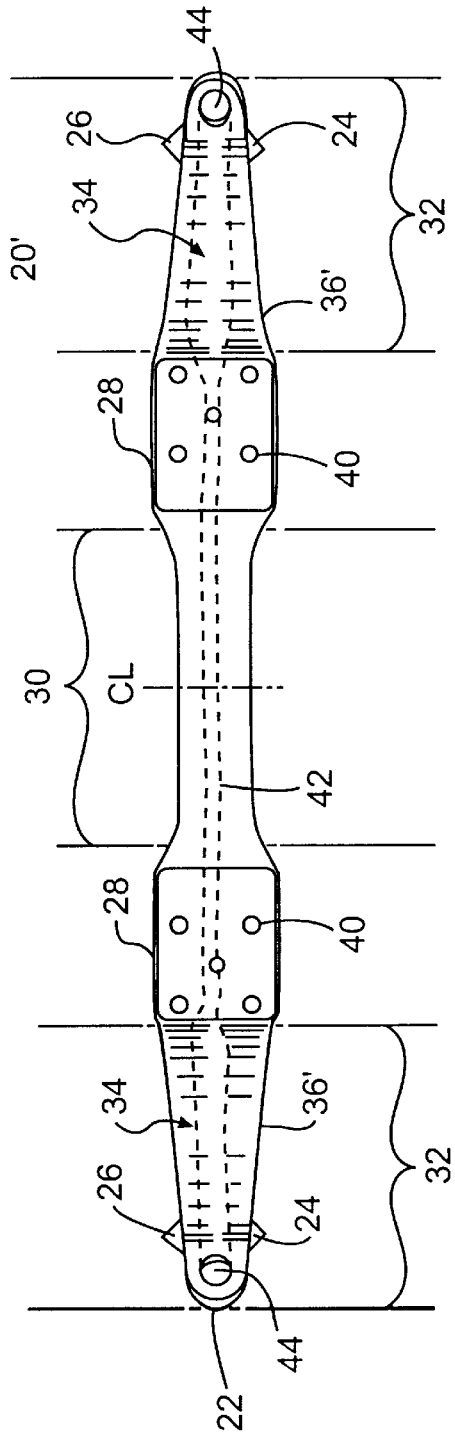
FIG. 6 is an elevational or plane view of a second embodiment of the present invention.

FIG. 6 illustrates a top view of elevational view of a second embodiment of the present invention. In FIGS. 6–12, like reference numerals will designate structures similar to those found in the first embodiment of the present invention. Differences in structure of the second embodiment relative to the first embodiment will be denoted with like reference numerals having prime designations and explanations for these differences in structure will be provided.

In FIG. 6, the first flange 36' has a different shape relative to the first flange 36 in the first embodiment. In the curved region 34, the first flange 36' has a substantially triangular shape where the first width W1' of the first flange 36' decreases in size from a respective support pad region 28 to a respective bore 44.

Figure 7:
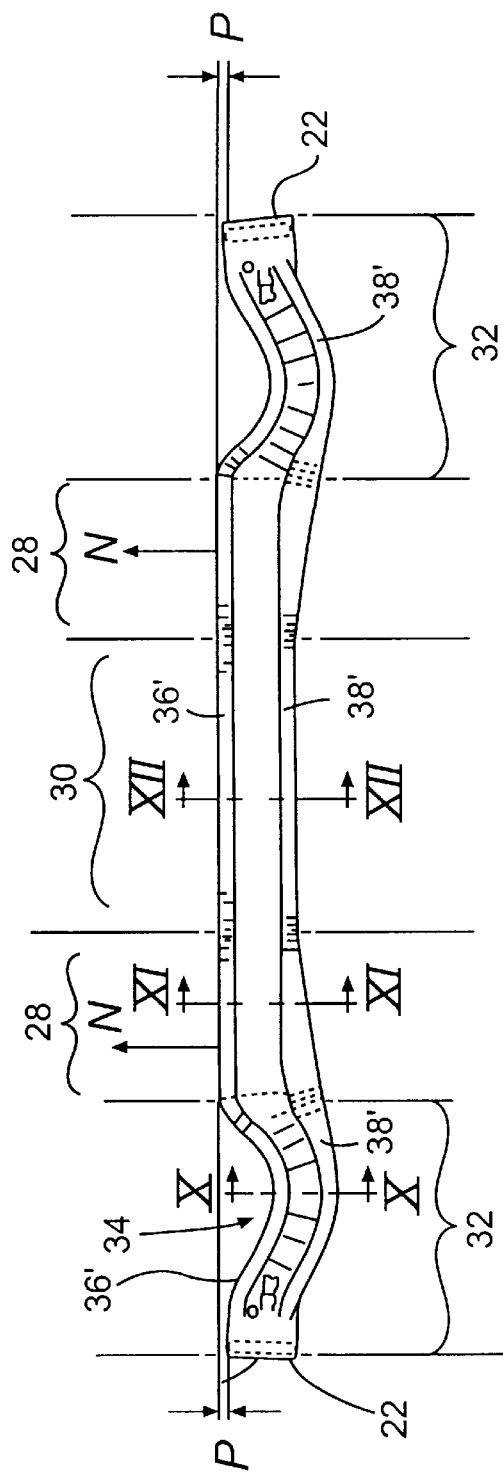
FIG. 7 is a side view of the second embodiment of the present invention.

FIG. 7 illustrates the second preferred embodiment of the invention where the second flange 38' in each curved region 34 and support pad region 28 has an increased thickness T (as more clearly shown in FIG. 11). The first flange 36' and second flange 38' in the respective curved regions 34 and support pad regions 28 form a substantially partial plano-concave shape relative to a respective geometric normal N of the geometric plane defined by the support pad region 28. Such a plano-concave shape substantially increases the strength of the steering axle 20' while substantially reducing any moments acting on the steering axle 20'.

Figure 8:
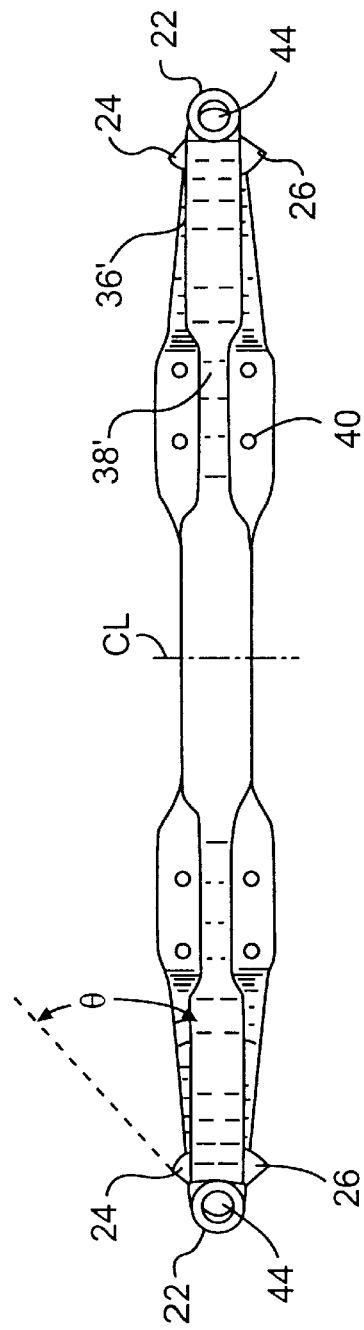
FIG. 8 is a bottom view, of the second embodiment of the present invention.

FIG. 8 further illustrates a bottom view or bottom elevational view of the steering axle 20' of the second embodiment of the present invention. FIG. 9 illustrates a side view of the steering axle 20' of the second embodiment of the present invention. As noted above, reference numeral P denotes the predetermined distance between an end surface of a kingpin bore cylinder 22 and a planar surface defined by the support region 28 having a geometric normal N.

Reference numeral S1 denotes the spacing between an end surface of the bore cylinder 22 and an edge surface of the first projecting stop 24. Reference numeral S2 denotes the spacing or distance between the edge surface of the bore cylinder 22 and an edge surface of the second projecting stop 26. As discussed above, the combination of elements provides a reversible steering axle which substantially reduces moments of the axle 20, 20' while substantially increasing clearance between the axle 20, 20' and a ground surface and increasing the strength of the axle 20, 20'.

The axle 20, 20' of both the first and second embodiments is preferably formed by casting and heat treating steel material. However, other materials are not beyond the scope of the present invention. Other materials include, but are not limited to, cast iron, non-ferrous alloys, ceramic materials, polymers, composite materials and any mixtures thereof. The axle 20, 20' is preferably designed for offroad vehicles such as rubber-tired industrial tractors. However, the present invention is not limited to these type of vehicles. Other types of vehicles include, but are not limited to, cars, trucks, loaders, diesel powered two and four-wheel drive pneumatic-tired prime movers, and other like vehicles.

The axle 20, 20' of the present invention is designed for axles of vehicles rated at 16,000 lbs. However, lighter or heavier sized vehicles are not beyond the scope of the present invention. For example, the present invention can be designed for 12,000 lb. rated axles.

EXAMPLE OF PREFERRED COMPOSITION AND STRENGTH

Table 1 illustrates the preferred concentration ranges of alloys and residual elements of the steel casting of the present invention. Table 1 is a result of the American Society for Testing and Materials (ASTM) E415-95a standard test method for optical emission vacuum spectrometric analysis of carbon and low-alloy steel.

Table 2 illustrates a preferred strength of the present invention according to the following tests: ASTM A370-97; ASTM E8-96; and ASTM E18-94. The above noted tests are standard test methods for the mechanical testing of steel products. The mechanical tests included a tension test, a bending test, a test for determining Rockwell hardness, and an impact test. The tests also covered the tension testing of the present invention at room temperature, specifically, the methods of determination of yield strength, yield point elongation, tensile strength, elongation, and reduction of area for a sample of the steel casting of the present invention.

TABLE I

REPORT OF TEST
SAMPLE ID: 270 POUND AXLE CASTING
RESULTS: %

| ANALYTE | CASTING |
| --- | --- |
| Total Carbon | .48 |
| Silicon | .53 |
| Sulfur | .013 |
| Manganese | .76 |
| Phosphorus | .022 |
| Nickel | .13 |
| Chromium | .18 |
| Molybdenum | .06 |
| Copper | .11 |
| Vanadium | .017 |
| Aluminum | .050 |

Tested in accordance with ASTM E415-95a.

TABLE 2

REPORT OF MECHANICAL TESTS
SAMPLE ID: 3252 = 270 POUND AXLE CASTING

| SAMPLE | ORIGINAL AREA INCHES | REDUCED AREA SQ. INCHES | REDUCTION IN AREA % | YIELD STRENGTH PSI | TENSILE STRENGTH PSI | ELONGATION 2.0 INCHES | | ROCKWELL HARDNESS (HRB) |
| --- | --- | --- | --- | --- | --- | --- | --- | --- |
| | | | | | | IN. | % | |
| 3252 | .1956 | .1479 | 24.4 | 51534 | 99821 | .348 | 17.4 | 93.5 |

Round, reduced section tensile
Yield taken at .2% offset
Tested in accordance with ASTM A370-97, ASTM E8-96 & ASTM E18-94

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A steering axle comprising:
a central beam region having a substantially I-shaped cross section, said I-shaped cross section being defined by a first flange spaced apart from a second flange with a web;
a first support pad region disposed adjacent to said central beam section;
a second support pad region disposed adjacent to said central beam section on a side opposite to said first support pad region, each pad region defining a geometric plane having a geometric normal, each geometric normal pointing away from said second flange and each support pad region having a first flange;
means for substantially reducing moments of said axle, for substantially increasing clearance between said axle and a ground surface, and for increasing strength of said axle, said means for reducing moments, increasing ground clearance, and strength including:
a first curved region disposed adjacent to said first support pad region, said first curved region including a substantially cylindrical bore disposed at an end thereof;
a second curved region disposed adjacent to said second support pad region, said second curved region including a substantially cylindrical bore disposed at an end thereof, a first flange of each curved region having a substantially concave shape relative to a respective geometric normal of a respective geometric plane, each cylindrical bore being spaced from a respective geometric plane in a direction opposite to a respective normal by a predetermined distance; and
wherein each first flange of said first and second curved regions is horizontally positioned so that each first flange of said first and second curved regions lies at or below the first flange of the central beam region.

2. The steering axle of claim 1, wherein said redetermined distance is substantially less than or equal to a height dimension of said I-shaped cross section of said central region.

3. The steering axle of claim 2, wherein each curved region has a substantially I-shaped cross section.

4. The steering axle of claim 3, wherein said first flange of each curved region has a first width, and wherein a second flange in each curved region has a second width, said web in each curved region has a third width, said first width being substantially greater than said second and third width, said third width increasing in size from a respective support pad region to a respective bore.

5. The steering axle of claim 4, wherein said second flange has a substantially double hour-glass shape.

6. The steering axle of claim 4, wherein each curved region includes a pair of sector shaped projections disposed adjacent to a respective bore.

7. The steering axle of claim 4, wherein said second flange in each curved region has a substantially concave shape relative to a respective geometric normal of a respective planar surface, said second flange in each curved region is substantially parallel to a respective first flange.

8. The steering axle of claim 7, wherein said web in each support pad region and said central region has a fourth width, said third width being substantially greater than said fourth width.

9. The steering axle of claim 8, wherein said web has a single hour-glass shape.

10. The steering axle of claim 4, wherein said second flange and said first flange in respective curved and support pad regions form a substantially partial plano-concave shape relative to a respective geometric normal of a respective planar surface.

11. The steering axle of claim 10, wherein said first flange in each curved region has a substantially triangular shape, said first width of said first flange decreasing in size from each support pad region to a respective bore.

12. The steering axle of claim 4, wherein said predetermined distance is generally between one quarter inch to one inch.

13. The steering axle of claim 12, wherein said predetermined distance is substantially equal to three-eighths of an inch.

14. The steering axle of claim 4, wherein each support pad region includes a plurality of apertures.

15. A method of substantially reducing moments of steering axle while substantially increasing ground clearance and strength of the steering axle, the method comprising:
forming a central beam region having a substantially I-shaped cross section;
forming said I-shaped cross section by casting a first flange spaced apart from a second flange with a web;
forming a first support pad region disposed adjacent to said central beam section;
forming a second support pad region disposed adjacent to said central beam section on a side opposite to said first support pad region, each support pad region being continuous with said central beam region, each pad region defining a geometric plane having a geometric normal, each geometric normal pointing away from said second flange;
forming a first curved region, ending in a bore adjacent to said first support pad region;
forming a second curved region ending in a bore adjacent to said second support pad region and a first flange for each curved region having a substantially concave shape relative to a respective geometric normal of a respective geometric plane, wherein each first flange of said first and second curved regions is horizontally positioned so that each first flange of said first and second curved regions lies at or below the first flange of the central beam region; and
spacing ends of each curved region from a respective geometric plane in a direction opposite to a respective normal by a predetermined distance.

16. The method of claim 15, further comprising the steps of:
heating said axle at a predetermined temperature;
forming a cylindrical bore in an end of said first curved region; and
forming a cylindrical bore in an end of said second curved region.

17. The method of claim 16, wherein said spacing step includes spacing ends of each curved region from a respective geometric plane in a direction opposite to a respective normal at a distance less than or equal to a height dimension of said I-shaped cross section of said central region.

18. The method of claim 17, further comprising the step of shaping a cross section of each curved region with a substantially T-shape.

19. The method of claim 18, further comprising the steps of:
forming said first flange of each curved region with a first width;
forming said second flange in each curved region with a second width; and forming said web in each curved region with a third width, said first width being substantially greater than said second and third width, said third width increasing in size from a respective support pad region to a respective bore.

20. The method of claim 19, further comprising the step of shaping said second flange into a substantially double hour-glass shape.

21. A steering axle comprising:

a central beam region having a first flange spaced apart from a second flange with a web, wherein said central beam region has a longitudinal central axis;

a first support pad region disposed adjacent to said central beam section;

a second support pad region disposed adjacent to said central beam section on a side opposite to said first support pad region, each pad region defining a geometric plane having a geometric normal, each geometric normal pointing away from said second flange;

means for substantially reducing moments of said axle, for substantially increasing clearance between said axle and a ground surface, and for increasing strength of said axle, said means for reducing moments, increasing ground clearance, and strength including:

a first curved region disposed adjacent to said first support pad region, said first curved region including a substantially cylindrical bore disposed at an end thereof;

a second curved region disposed adjacent to said second support pad region, said second curved region including a substantially cylindrical bore disposed at an end thereof, a first flange of each curved region having a substantially concave shape relative to a respective geometric normal of a respective geometric plane, each cylindrical bore being spaced from a respective geometric plane in a direction opposite to a respective normal by a predetermined distance, wherein each first flange of each curved region is positioned at or below the longitudinal central axis of said central beam region; and reversible stop means disposed adjacent to each bore, whereby said axle is reversible to facilitate installation on multiple types of vehicles.

22. The axle of claim 21, wherein said predetermined distance is a first predetermined distance, said reversible stop means includes a pair of projections disposed adjacent to each bore, one of each pair of projections disposed at a second predetermined distance from a first surface of a respective bore, and another of each pair of projections disposed at a third predetermined distance from said first surface of a respective bore.

23. The axle of claim 22, wherein said second predetermined distance is generally between 1.0 and 3.0 inches, said third predetermined distance is generally between 1.5 and 3.5 inches.

24. The axle of claim 23, wherein said second predetermined distance is substantially equal to 2.0 inches, said third predetermined distance is substantially equal to 2.5 inches.

25. The axle of claim 22, wherein each projection has a substantially sector shape.

26. The axle of claim 25, wherein each projection has an angle substantially equal to 5° degrees.

27. A method of substantially reducing moments of a reversible steering axle while substantially increasing ground clearance and strength of the steering axle, the method comprising:

forming a central beam region by casting a first flange spaced apart from a second flange with a web, wherein said central beam region has a longitudinal central axis;

forming a first support pad region disposed adjacent to said central beam section;

forming a second support pad region disposed adjacent to said central beam section on a side opposite to said first support pad region, each support pad region being continuous with said central beam region, each pad region defining a geometric plane having a geometric normal, each geometric normal pointing away from said second flange; forming a first curved region disposed adjacent to said first support pad region;

forming a second curved region ending in a bore adjacent to said first support pad region and a first flange for each curved region having a substantially concave shape relative to a respective geometric normal of a respective geometric plane, wherein each first flange of each curved region is formed at a position at or below the longitudinal central axis of said central beam region;

spacing ends of each curved region from a respective geometric plane in a direction opposite to a respective normal by a first predetermined distance;

forming a pair of projections disposed adjacent to each bore;

spacing one of each pair of projections disposed at a second predetermined distance from a first surface of a respective bore; and spacing another of each pair of projections disposed at a third predetermined distance from said first surface of a respective bore.

28. The method of claim 27, further comprising the steps of:

heating said axle at a predetermined temperature;

forming a cylindrical bore in an end of said first curved region; and forming a cylindrical bore in an end of said second curved region.

29. The method of claim 27, wherein said spacing step includes spacing ends of each curved region from a respective geometric plane in a direction opposite to a respective normal at a distance less than or equal to a height dimension of said central region.

30. The method of claim 27, further comprising the step of shaping a cross section of each curved region with a substantially T-shape.

* * * * *